(12) United States Patent
Thomas et al.

(10) Patent No.: US 6,301,320 B1
(45) Date of Patent: Oct. 9, 2001

(54) NUCLEAR FUEL ASSEMBLY HAVING MOX RODS AND MOX-GADOLINIA RODS

(75) Inventors: Gwilym Michael Thomas; Kevin Wynn Hesketh, both of Preston (GB)

(73) Assignee: British Nuclear Fuel PLC, Cheshire (GB)

(*) Notice: Subject to any disclaimer, the term of this patent is extended or adjusted under 35 U.S.C. 154(b) by 0 days.

(21) Appl. No.: 09/269,012

(22) PCT Filed: Sep. 19, 1997

(86) PCT No.: PCT/GB97/02575

§ 371 Date: Nov. 9, 1999

§ 102(e) Date: Nov. 9, 1999

(87) PCT Pub. No.: WO98/14957

PCT Pub. Date: Apr. 9, 1998

(30) Foreign Application Priority Data

Oct. 2, 1996 (GB) .................................................. 9620569

(51) Int. Cl.[7] .................................................. G21C 3/326
(52) U.S. Cl. .................... 376/435; 376/327; 376/412; 376/421; 376/428; 376/419; 376/447
(58) Field of Search ..................... 376/327, 412, 376/435, 421, 428, 419, 447

(56) References Cited

U.S. PATENT DOCUMENTS

| | | | |
|---|---|---|---|
| 5,309,493 | * 5/1994 | Kamimura et al. | 376/431 |
| 5,377,247 | * 12/1994 | Yoshioka et al. | 376/428 |
| 5,440,598 | * 8/1995 | Reese et al. | 376/435 |
| 5,781,604 | * 7/1998 | Haikawa et al. | 376/419 |
| 5,822,388 | * 10/1998 | Krantrowitz et al. | 376/435 |
| 6,061,416 | * 5/2000 | Koyama et al. | 376/435 |
| 6,233,302 | * 5/2001 | Krantrowitz et al. | 376/435 |

FOREIGN PATENT DOCUMENTS

| | | | |
|---|---|---|---|
| 41 13 729 | 10/1991 | (DE) . | |
| 0664546A1 | * 1/1995 | (EP) | G21C/3/326 |
| 0 664 546 | 7/1995 | (EP) . | |
| 2258340A | * 1/1993 | (GB) | G21C/3/18 |
| 2 258 340 | 2/1993 | (GB) . | |

OTHER PUBLICATIONS

Japanese abstract, vol. 014, No. 258 (P–1055), Jun. 4, 1990.
Japanese abstract, JP 02 067991A, Power Reactor and Nuclear Fuel Development Corp., Mar 7, 1990.
Database WPI, Section Ch, week 8652, Derwent Publications.
Japanese abstract, JP 61 254887A, Doryokuro Kakunenryo Kaihatsu, Nov. 12, 1986.

* cited by examiner

Primary Examiner—Charles T. Jordan
Assistant Examiner—John Richardson
(74) Attorney, Agent, or Firm—Workman, Nydegger & Seeley (57) ABSTRACT

Nuclear fuel assembly configurations are provided for mixed oxide fuels. Neutron poisons are provided within the MOX of certain fuel rods in the fuel assembly, those fuel rods being preferentially grouped towards the periphery of the fuel assembly. In this way, optimized reduction of reactivity is provided during the initial part of the fuel cycle but the neutron poison is burnt out so as not to interfere with the reactivity during subsequent parts of the cycle.

12 Claims, 6 Drawing Sheets

NUCLEAR FUEL ASSEMBLY HAVING MOX RODS AND MOX-GADOLINIA RODS

BACKGROUND OF THE INVENTION

1. Field of the Invention

This invention is concerned with improvements in and relating to fuel rods and assemblies for nuclear reactors, principally of the mixed oxide fuel (MOX) type and in particular, but not exclusively, for pressurised water reactors (PWR).

2. Present State of the Art

Operators of nuclear reactors throughout the world increasingly wish to run their reactors on a longer fuel cycle than that previously entertained. Eighteen or even twenty four month cycles are now preferred between reloads. Whilst such runs call for more expensive fuel to be provided in the first place, cost savings are made in terms of the overall power generation from the fuel cycle as the shut down period for re-fuelling occurs less frequently. A re-fuelling cycle can take up to six weeks during which time the reactor is off line. The procedure also involves an experienced and consequently expensive team to be involved on site. In addition, re-fuelling is normally followed by having to obtain regulatory approval before the reactor can be brought on line once more.

Where longer fuel cycles are employed, to achieve the desired level of activity and hence power output from the reactor at the end of the cycle, the fuel must provide a higher reactivity level to start with. To provide even output over the cycle despite this higher initial reactivity a form of neutron poison, such as boron-10, must be provided at start up to inhibit the reactivity at this stage. The poisons involved, which may be of a variety of types, commonly act as neutron absorbers and consequently depress the reactivity whilst present. Whilst these poisons are essential during the initial part of the cycle, towards its end they must no longer be present as this would defeat the object by lowering the reactivity at the end of the cycle too.

Control of reactivity has previously been addressed in a number of ways in conjunction with solely uranium fuel reactors.

Control has been provided in the past by providing poison materials in the reactor at start up and during the initial part of the cycle and subsequently physically removing them as the cycle progresses. Clearly such an arrangement is mechanically and methodically complex.

Other control techniques have involved the provision of discrete poison rods which are inserted into the guide thimbles of a fuel assembly. Thus the fuel material is provided in one or more grades in rods and the poison is provided in a separate set of rods. Unfortunately, the provision of such discrete rods in the right amount to provide the desired level of reactivity control at the beginning of the cycle and yet not interfere with the end of the cycle is very difficult indeed. In addition, even if the poisons burn out during the subsequent part of the cycle the overall assembly is effectively unbalanced where the poison rod used to be. This lack of balance can present itself as hot spots which are highly undesirable and can lead to stresses which deform the assembly in that region. Additionally, these "empty" spaces formerly occupied by the poison rods are not available for water passage and consequently the transfer rate is diminished.

In a further prior art system $UO_2$ fuel rods only have been provided in conjunction with lower grade $UO_2$ which contains the poison; 6 wt % poison in 1.8 wt % $U_{235}$. The poison is provided as a part of the fuel or alternatively as a coating around the circumference of the pellets. Construction of such assemblies is complex and time consuming as different levels and contents are frequently employed for different parts of the reactor fuel cell. Even longitudinally, within a given rod the enrichment grade and poison presence may vary.

The prior art problems are particularly acute in MOX reactor cores as MOX itself is a bigger absorber of neutrons than $UO_2$. As a consequence poison provision using discrete rods is even harder to control than in other fuel types as the burn out rates for poisons in such MOX reactors is lower. If combined $UO_2$ poison rods are employed in such reactor systems a further problem occurs where the poison does eventually burn out due to the differential absorption properties of MOX and $UO_2$. As a consequence power peaking around the formerly poison containing $UO_2$ rod occurs at a later date. Once again, this can lead to undesirable hot spots within the core leading to undesirable stresses and potential melting of the fuel rods.

Similar problems occur where discrete poisoning is provided within fuel rods or pellets, for instance as a central core. Neutron access for the poison is poor in such cases and once burnt out gives significant variations with location.

Poison systems have not successfully been employed in MOX fuelled reactors to date. At present at least 3 plutonium grades are provided in the fuel rods.

OBJECTS AND BRIEF SUMMARY OF THE INVENTION

Amongst the aims of the present invention it attempts to provide an improved fuel assembly, fuel rods, a method of reactor control and improved fuel regime.

According to a first aspect of the invention we provide a fuel rod, said fuel rod containing mixed oxide fuel and a neutron poison.

The provision of the neutron poison in the fuel rod with the mixed oxide fuel has advantages in simplifying the production technique.

Preferably the neutron poison is gadolinia ($Gd_2O_3$) or substantially consists of gadolinia. The gadolinia may be present at between 0.25 and 3 weight per cent, or 0.5 and 2.5 weight per cent compared with the total fuel rod contents. The provision of between 0.75 and 1.75, and most preferably 1 and 1.5 weight per cent is particularly preferred. The reduced level of gadolinia employed, whilst effectively providing the desired degree of neutron absorbtion, does not significantly detract from the thermal conductivity of the fuel rod.

Preferably the mixed oxide fuel accounts for the remainder of the fuel contents. The plutonium content of the fuel rod may be between 3% and 12% and most preferably 6% and 10%. The balance of the fuel rod contents preferably comprise depleted $UO_2$.

Preferably the neutron poison is mixed with the mixed oxide fuel, most preferably intimately. Homogenous dispersion of the poison in this way in the MOX is highly advantageous. The possibility also exists to coat the mixed oxide fuels around its circumference with the neutron poisons. The fuel rod may contain a middle segment containing mixed oxide fuel and the neutron poison with a mixed oxide only portion being provided at one or either end of the fuel rod. The portion provided with the neutron poison, and in particular gadolinia, may comprise between 40% and 95% of the fuel rod length measured from end cap to end cap. In a particularly preferred form the portion containing the gadolinia is between 75 and 85% of the length.

The fuel rod may be for a pressurised water or boiling water reactor.

According to a second aspect of the invention we provide a fuel assembly comprising a multiplicity of fuel rods wherein the assembly comprises a first fuel rod type provided with mixed oxide fuel and a second fuel rod type provided with mixed oxide fuel in conjunction with a neutron poison.

A MOX fuel assembly provided in this way offers controlled reactivity during the initial phase of the cycle and yet offers longer cycles than previously possible.

Preferably the neutron poison is gadolinia. The gadolinia is preferably present as between 0.5 and 2.5 weight per cent compared with the total fuel content of a second type rod.

Preferably the first type rod contains mixed oxide fuel only. Preferably the plutonium content of such first type rods is between 3% and 12%, most preferably 6 to 10%, by weight compared with the total fuel content of the first type rod. The remaining material in the first type rod is preferably depleted $UO_2$.

Preferably the mixed oxide of the second type rod contains between 1.5% and 8%, preferably 3 to 6% plutonium.

The plutonium content of the second type is preferably between 20% and 75% that of the first type, for instance 25 to 50%.

The plutonium content of the second type may be up to 50% lower than the first type.

Preferably the poison, plutonium, oxide and uranium oxide are intimately mixed with one another.

Preferably the fuel rods of such a fuel assembly consist of first and second,type fuel rods only. Preferably only two different fuel enrichments, most preferably plutonium enrichments, are provided in the fuel assembly. Preferably the corner fuel rods, with only two fuel enrichments in the assembly, do not exceed the maximum power threshold, for instance a power of less than 1.6 and more preferably 1.55. A reduced number of fuel and/or Pu enrichments is achieved in this way with reduced fabrication costs over the prior art as downtime between enrichment change-overs is reduced, as is waste.

Control rods or spaces to accommodate control rods may be provided in the fuel assembly.

Fuel rods of the second type may comprise between 10% and 40% of the fuel rods in an assembly. Most preferably 20% to 30% of the fuel rods are of the second type.

Between 5% and 15% of fuel rod locations in the assembly may be provided so as to accommodate control rods.

The remainder of the fuel rod assembly is preferably made up of first typesfuel rods.

The fuel rod assembly may comprise a multiplicity of fuel rods in an array of 6×6 or more fuel rods. Thus for example, 7×7, 9×9, 14×14 and 17×17 arrays may be provided.

The fuel assembly may be provided for a pressurised water reactor.

The second type fuel rods may be provided at, or adjacent, the periphery of the fuel assembly. Most preferably the second type fuel rods are provided as the edge rods in a given fuel assembly. The provision of the second type rods at the periphery and/or immediately adjacent to the peripheral fuel rods is also envisaged.

Preferably between 60% and 90% of the second type fuel rods are provided as edge fuel rods in the assembly.

Between 50 and 10%, and more preferably between 65 and 100% of the rods at the periphery may be second type rods.

Between 10% and 20% of the second type fuel rods may be provided as non-peripheral fuel rods. Most preferably all or substantially all of these second type non-peripheral fuel rods are provided adjacent to peripheral fuel rods.

Between 0 and 50% of the rods adjacent to the periphery may be second type rods. More preferably between 5 and 35% are so provided. Between 0 and 15%, and more preferably between 3 and 10% of the non-peripheral fuel rods may be of the second type.

Alternatively the fuel assembly may be provided for a boiling water reactor.

For boiling water reactors, in particular, different second type fuel rod configurations may be provided within the array. The second type fuel rods may be provided as intermediate rods. Preferably first type rods are provided as the, or substantially all, of the peripheral rods. Preferably first type rods are provided as the, or substantially all, of the rods around the water passage. In this way the full effect of the control blade is maintained.

According to a third aspect of the invention we provide a nuclear reactor core incorporating one or more fuel assemblies according to the second aspect of the invention and/or one or more fuel rods according to the first aspect of the invention.

Preferably the peak rod power to average assembly power ratio for such a reactor core is between 1.65:1 and 1.4:1. A ratio of less than 1.60:1, more preferably 1.55:1 and most preferably 1.5:1 and ideally less than 1.45:1 is desired.

Preferably the aforementioned peak to average power ratios are maintained throughout the fuel cycle, or at least following the first 150 hours.

Preferably the average power of a given assembly increases relative to the initial value. The peak power value of the same assembly may increase relative to the initial value. Preferably the peak to average power ratio reduces during the cycle, or at least during the first 5000 hours.

Preferably the desired peak to average ratios exist between 3000 and 10000 hours of the fuel cycle.

BRIEF DESCRIPTION OF THE DRAWINGS

Various aspects of the invention will now be described, by way of example only, and with reference to the accompanying drawings in which.

DETAILED DESCRIPTION OF THE PREFERRED EMBODIMENT

Figure 1:
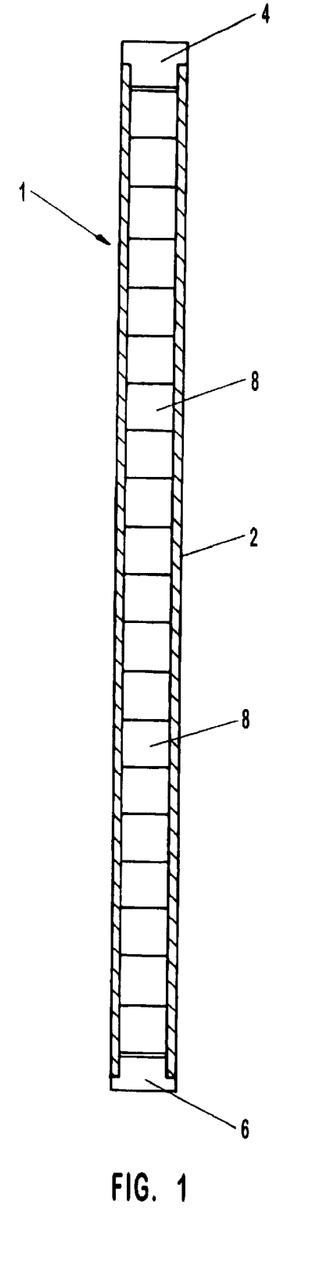
FIG. 1 illustrates a fuel rod.

The fuel rod illustrated (1) in FIG. 1 in cross section comprises a casing (2), commonly of a neutron transparent material such as zirconium alloy with removable end plugs (4, 6). The fuel rod is commonly cylindrical and fuel or other material pellets (8) of a snug fit are provided in its interior. The pellets, which may be of fuel or other materials are slid into the fuel rod from cans during assembly.

Figure 2:
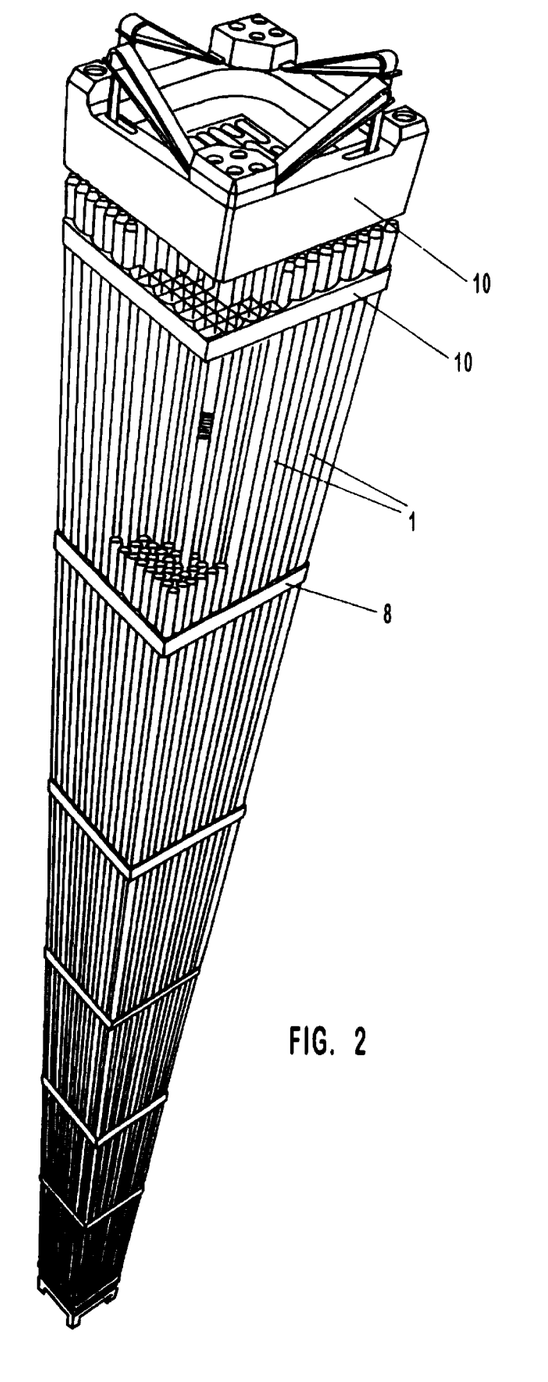
FIG. 2 illustrates a fuel rod assembly.

A typical fuel rod assembly, in this case a pressurised water assembly, as illustrated in FIG. 2, consists of an array of such fuel rods (1) assembled in a lattice. Suitable bracing frameworks (10) are provided to securely mount the individual fuel rods within the assembly. The spaces between the fuel rods provide for the flow of water through the reactor in use. The water is essential in transferring the heat generated within the reactor to external locations where power can be extracted and converted into electricity.

The present invention in a specific embodiment makes use of two particular types of fuel rod. Firstly there is the MOX fuel type and secondly a MOX fuel doped with gadolinia type.

The first type rod contains fuel pellets made up of plutonium and depleted uranium. The composition of such fuel rods is 9% plutonium with the balance being made up of $UO_2$. The pellets in such a fuel rod are consistent in their plutonium levels.

The second type of fuel rod provided in the invention consists of mixed oxide fuel made up of plutonium mixed with depleted uranium in conjunction with a neutron poison. A slightly lower level of plutonium is employed in this second type of rod, 6% plutonium being used. The provision of 1.5% gadolinia in these doped fuel rods, with the balance being made up depleted uranium, provides significant advantages as discussed below.

The plutonium, gadolinia and depleted uranium in this second type fuel rod are intimately mixed during manufacture and formed into pellets in the conventional way.

The production of gadolinia alone, suitable for use in the present invention, is known in the art.

The provision of the poison in this way and at the levels provided ensures that the reactivity throughout an 18 to 24 month cycle is provided at the desired level. The correct level of poisoning is provided at the commencement of the cycle, whilst burn up of the poison at the desired rate so as not to interfere with reactivity at the later part of the cycle is enabled.

Additionally, by providing the poison in the fuel rods, rather than as discrete units, "holes" in the fuel rod assembly are avoided. Maximum transfer rates for the heat and minimal power peaking is thus provided. Furthermore, as only two levels of plutonium enrichment are provided fabrication costs are reduced compared with previous assemblies where a variety of enrichments and fuel rod configurations had to be provided The provision of gadolinia at the level set out in this invention is also advantageous as gadolinia is a poor thermal conductor relative to the fuel itself. Thus at the levels of poisoning required by the prior art thermal conductivity was severely hampered. In the present invention on the other hand the level of gadolinia is sufficiently low as to make negligible impact on the thermal conductivity of the rod. The intimate mixing also assists in this regard in avoiding localised poor conducting volumes.

Figure 3:
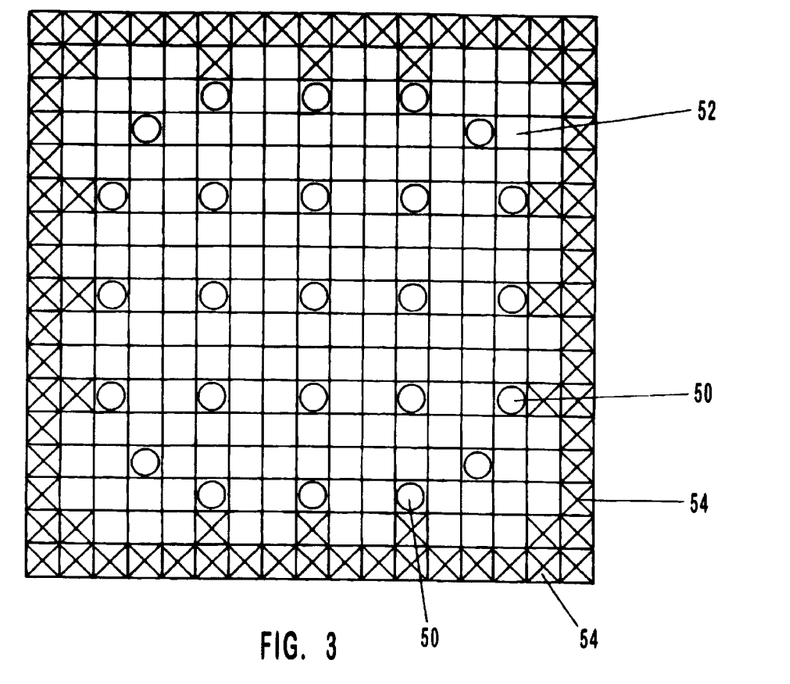
FIG. 3 illustrates a first embodiment of a fuel assembly distribution.

Beyond the provision of gadolinia in the MOX rod itself; the invention offers further advantages in terms of the configurations to which such fuel rods can be used. FIG. 3 illustrates one embodiment of a fuel assembly distribution, suitable for a PWR for instance, in which the fuel rod assembly is shown in a schematic plan. The assembly shown is of a conventional size, namely 17 fuel rods by 17 fuel rods. In reality the fuel rods are cylindrical and as a consequence significant gaps exist between fuel rods allowing the passage of water.

As illustrated in FIG. 3 the squares provided with a circle (50) are available to allow incorporation of control rods into the fuel assembly. Conventional control rods such as those formed from Silver-Indium-Cadmium (Ag—In—Cd) can be used to this end.

The parts of the lattice left blank (52) correspond to fuel rods of the first type provided with MOX fuel. Around the periphery of the array the crossed elements (54) correspond to the poisoned MOX fuel rods, the second type.

As can be seen the majority of the poisoned MOX fuel rods are either provided at the periphery of the assembly or as rods adjoining peripheral rods. This assembly style has significant advantages, particularly with regard to PWR reactors. Firstly the distancing of the doped rods from the central part of the fuel assembly allows for control rods to be introduced if desired, and yet still have a substantial affect on the assembly. If the poisoned rods are provided in proximity to the control rods then the neutron absorbing effect of the control rods will be significantly diminished. Full control over the fuel assembly is thus provided by this configuration.

The provision of the poisoned rods at the periphery also avoids the need for the fuel assembly to contain a significant number of different grades of fuel rod.

Conventional systems employ the highest grade at the core of a fuel assembly with medium enriched rods around this and towards the perimeter and with a lower grade still provided at the corner locations. This configuration has previously been used in order to avoid net neutron currents between assemblies. With the present invention this is not necessary as full control over the assembly is provided by the two types of fuel rod.

Figure 4:
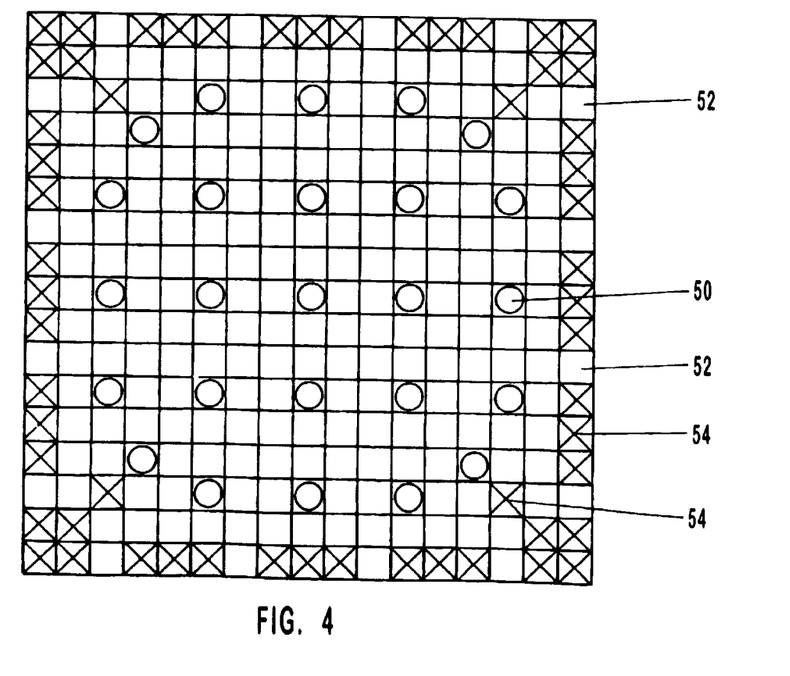
FIG. 4 illustrates a second embodiment of a fuel rod assembly distribution.

FIG. 4 of the invention illustrates an alternative embodiment for the fuel rod configuration. In this configuration the majority of peripheral rods are of the second type (58) but the invention's benefits still accrue with some peripheral first type rods (52) also. The assemblies need not be symmetrical.

Figure 5:
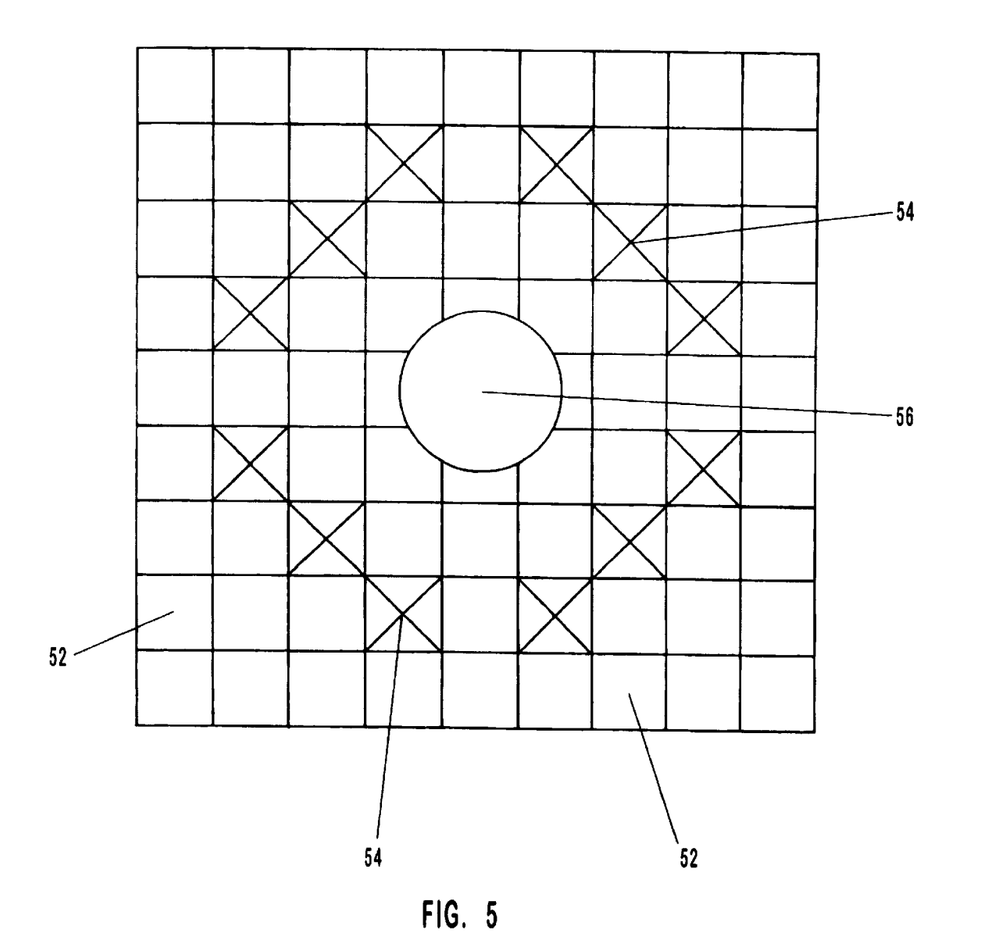
FIG. 5 illustrates a further embodiment of a fuel rod assembly distribution.

FIG. 5 illustrates a fuel rod configuration for a fuel assembly more suited to a BWR. In this structure the areas designated (56) correspond to the water conduits. As the control blades in BWR's are employed in a different manner to PWR's the doped MOX configuration is somewhat different. The same symbols are applied to this array as used in FIGS. 3 and 4. By placing the second type rods (54) inside the assembly the full effect of the external control blades is maintained.

Figure 6:
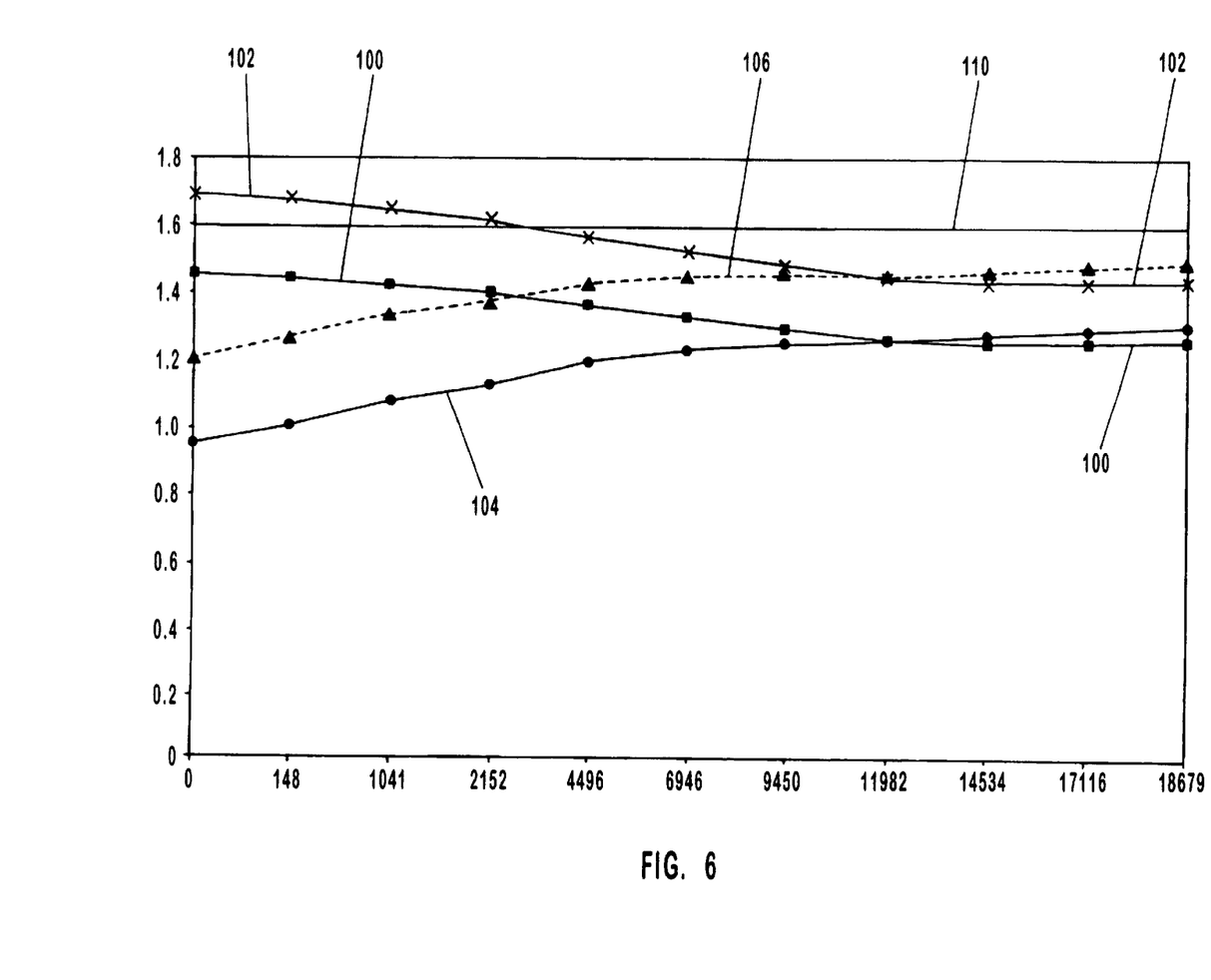
FIG. 6 illustrates average power and peak levels over time for an assembly according to the present invention and also for a Gadolinia free assembly.

FIG. 6 illustrates a comparison between the average power and peak power fuel assembly within a reactor using entirely MOX fuel without Gadolinia doping and also for MOX fuel together with Gadolinia doped MOX according to the present invention.

Within reactors certain assemblies, and even certain rods, can have a higher power level due to the conditions that they are under. Any given reactor has a maximum level at which any one assembly can run and as a consequence a safety margin must be maintained between this and the peak power level in practice. By its very nature the average power is some way below the peak power.

The closer the average power can be run to the maximum the greater the energy extracted from the reactor. Breeching of the maximum power level, however, can cause thermal distortion and mechanical damage within the assembly causing significant delays and costs during any re-loading scheme. Other problems also follow from exceeding the power limit.

FIG. 6 represents the power limit line (110) as being provided at 1.6 power against time in hours. When the average power line for unpoisoned MOX (100) and the peak power for unpoisoned MOX (102) are compared against the average power for the doped MOX according to the present invention (104) and the peak power for the doped MOX according to the present invention (106) significant differences are clear.

Whilst in the latter stages of the cycle the peak and average power levels for the undoped MOX are comparable with, although lower, than the doped MOX, during the initial stages of the fuel cycle both the average and peak power are significantly higher. Indeed for the given average power at the end of the cycle the peak power (102) at the beginning exceeds the threshold (110). Thus if the essential compensation is made to keep the peak level (102) below the threshold (110) during the early part of the cycle by the end of the cycle the average power is consequently ever lower than with the doped MOX.

In the early part of the cycle, on the contrary, the doped MOX peak and average power level are always well below the threshold line (110) and indeed a still higher grade of plutonium, with increased reactivity, could be used whilst still keeping the level well below the threshold value (110).

A far greater average power over the entire fuel cycle is thus possible using the present invention as compared with undoped MOX. The longer the fuel cycle in question the more significant this difference becomes.

Figure 7:
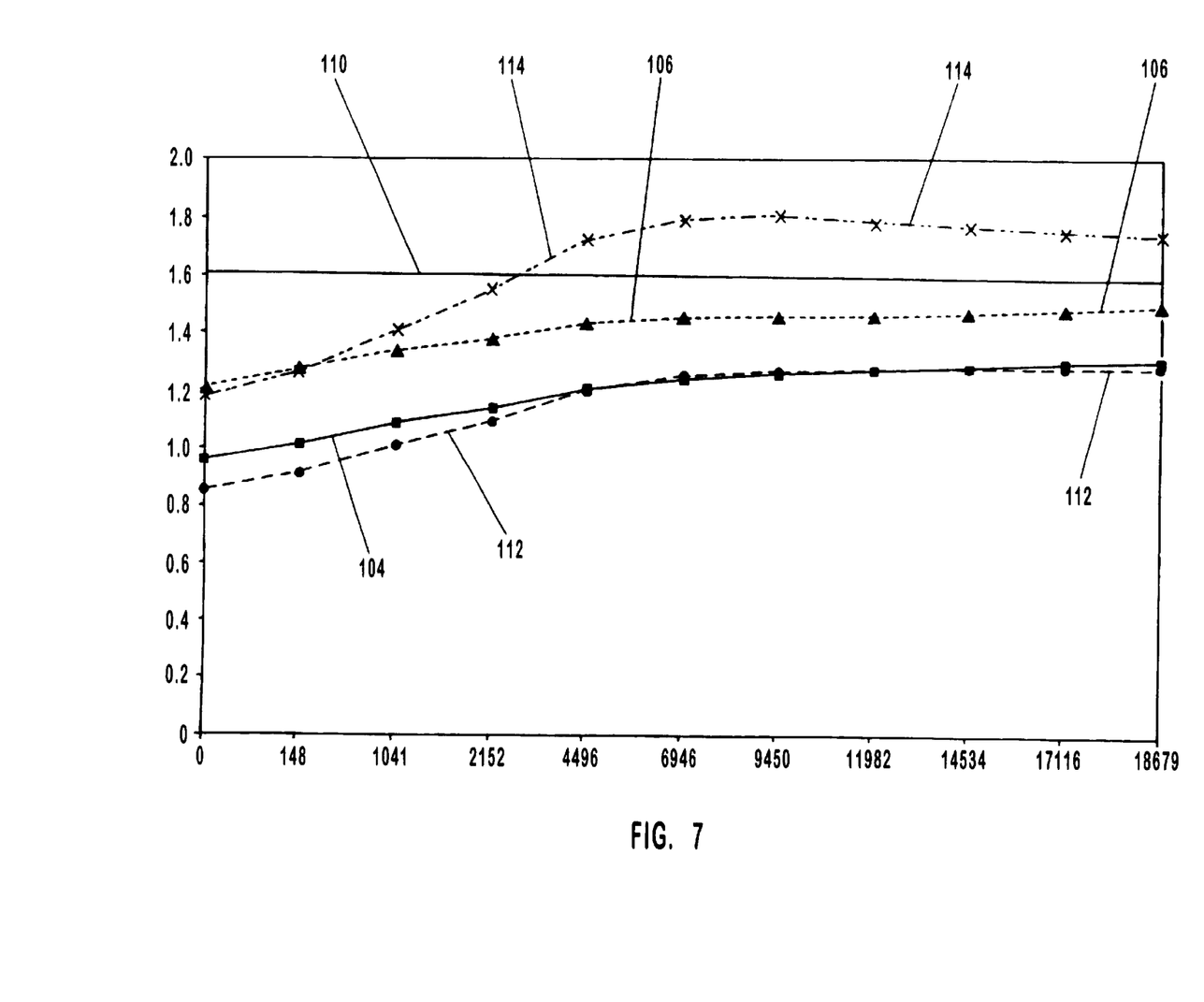
FIG. 7 illustrates average power and peak levels over time for an assembly according to the present invention and also for a $UO_2$ assembly with Gadolinia.

FIG. 7 illustrates a similar comparison between the doped MOX peak level (106), doped MOX average power level (104) and the threshold value (110) as against $UO_2$ doped with Gadolinia average power level (112) and peak power level (114).

In this comparison whilst the average power from the doped $UO_2$ line (112) is comparable with, although lower, than the average power with the MOX doped according to the present invention (104) very significant differences occur in the peak value.

As can be seen the peak line (106) for the MOX doped according to the present invention remains relatively low and well below the threshold line (110). On the contrary the peak line (114) for the $UO_2$ doped with Gadolinia relatively quickly exceeds the threshold value (110). This fuel regime gives rise to a number of rods which are at a significantly higher power output than the average. As a consequence, to maintain the peak rods below the threshold value the average power output of the peak assemblies must be significantly reduced. Once again, therefore, the present invention offers significant advantages in terms of the average power output of the peak assemblies which can be maintained over the entire fuel cycle.

Figure 8:
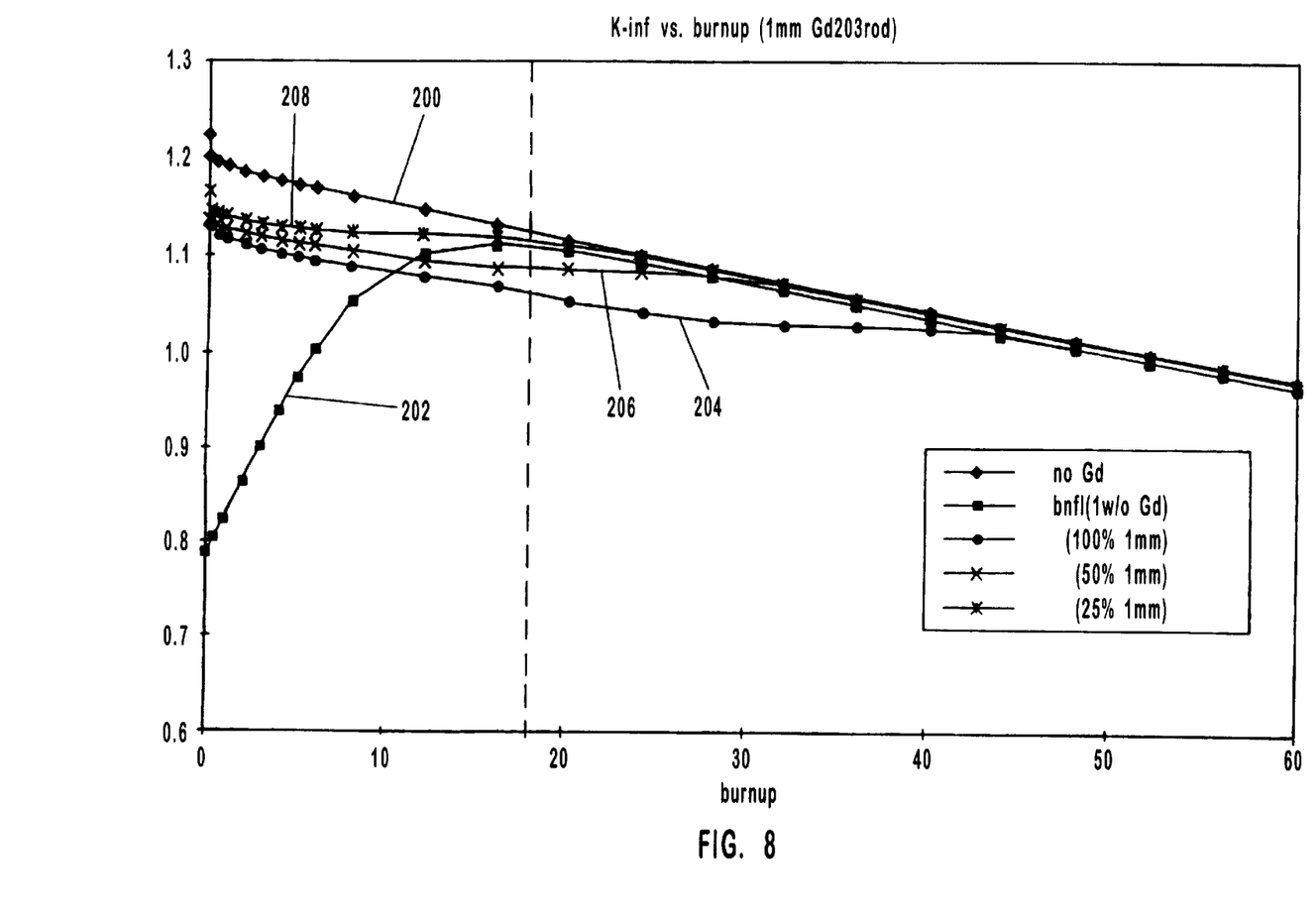
FIG. 8 illustrates reactivity levels for fuel assemblies consisting of various poison or unpoisoned fuel rod embodiments.

The manner in which the neutron poison is provided in the fuel rod is also significant to its effectiveness. FIG. 8 illustrates K-Infinity values for fuel assemblies incorporating a variety of fuel designs. The values are plotted against burn up cycle time in months.

Line 200 illustrates the variation and the time for an undoped MOX assembly and clearly shows the tailing off as the fuel is consumed.

Line 202 illustrates a fuel assembly according to a preferred form of the invention with both MOX rods and around its periphery MOX rods with Gadolinia poisoning being provided. The Gadolinia is provided at 1 weight per cent in these rods. The neutron poison is provided intimately mixed with the MOX fuel. As is desired the performance clearly indicates the depression of the reactivity during the initial part of the burn up cycle. This allows higher levels of plutonium enrichment to be provided as the increased reactivity arising therefrom is inhibited during this initial peak part of the cycle. By 18 months, dashed vertical line, the reactivity has risen to reach its peak value. This reflects the efficient burn up of the neutron poison during this first cycle period. Neutron poisoning is not needed, and indeed is highly detrimental, beyond the first cycle as the overall reactivity is now decreased.

Beyond the first cycle the majority of Gadolinia has burnt out so the reactivity of the assembly behaves in a similar manner to an unpoisoned assembly 200.

Alternative ways of providing the neutron poison in MOX fuel assemblies function less successfully. Lines 204, 206, 208 respectively detail the variation for a MOX fuel rod plus a poison containing MOX fuel rod incorporating assembly. In this case, however, the poison rods are formed from a discreet Gadolinia core around which annular pellets of MOX are provided. The lines indicate a 1 mm Gadolinia core at 100% (204); 50% (206); and 25% (208) loading.

As can be seen the provision of neutron poisoning has the effect of reducing initial reactivity but to a far lesser extent than for line 202. Because the reduction is far less this would mean that the overall reactivity levels have to be kept lower to avoid those levels exceeding the threshold limit during the early part of the cycle. This has the effect of reducing reactivity during the latter stages of the cycle still further and as a result reduced power output arises. The presence of neutron poisoning also prevents the conventional technique of moving the assemblies inward within a core at the end of the first cycle. The negative effects would be even greater if still partially poison rods are present in a fuel assembly move towards the centre of a reactor core.

The lower amount of depression is seemingly due to the reduced access of the Gadolinia core to the thermal neutrons. Less interaction therefore occurs. This reduction is both due to shielding by the neutron absorbing MOX and also due to the lower chance of neutron incidents, where the Gadolinia is presented in restricted locations.

Not only does poisoning in this manner not work as efficiently and successfully in the early part of the fuel cycle, but it is also problematical later on. Whilst 202 begins to pick up significantly during the latter part of the first 18 month fuel cycle the assemblies poisoned by a core remain depressed. This effect continues well into the second cycle. This means that the activity depression due to the poisoning occurs long after it is needed so decreasing reactor performance. This problem again stems from the Gadolinia positioning as poor access leads to a low burner rate and hence long term presence of neutron poisons.

Intimate mixing of the Gadolinia, therefore, clearly gives further benefits over and above those achieved by providing poisoning in the MOX rods themselves. Reactivity depression only when desired is provided in this way.

The physical performance characteristics (both structural and heat transfer) are also far better for intimately provided poisons than for discreetly provided poisons. This is especially so as the poison becomes burnt up.

What is claimed is:

1. A fuel assembly comprising a multiplicity of fuel rods including a first fuel rod type provided with mixed oxide fuel and a second fuel rod type provided with mixed oxide fuel in conjunction with a neutron poison, the mixed oxide and neutron poison being intimately mixed in the second fuel rod type, the fuel rods having peripheral fuel rods wherein between 50 and 100% of the,peripheral fuel rods of the assembly being of the second fuel rod type.

2. A fuel assembly according to claim 1 in which between 0 and 50% of the fuel rods adjacent the peripheral fuel rods are of the second type.

3. A fuel assembly according to claim 1 in which between 0 and 15% of the non peripheral fuel rods are of the second type.

4. A fuel assembly according to claim 1 in which the neutron poison is Gadolinia.

5. A fuel assembly according to claim 1 in which the neutron poison is provided at between 0.5 and 2 weight percent.

6. A fuel assembly according to claim 1 in which only first and second type fuel rods are present.

7. A fuel assembly according to claim 1 in which the first type rod contains mixed oxide fuel with a plutonium content of between 3 and 12% by weight of the total fuel content of the first type rod.

8. A fuel assembly according to claim 7 in which the plutonium content of the second type fuel rod is between 20% and 75% that of the first type.

9. A fuel rod assembly according to claim 1 which is a pressurized water reactor fuel assembly.

10. A system comprising:
   a pressurized water nuclear reactor; and
   the fuel assembly as recited in claim 1 disposed within the pressurized water nuclear reactor.

11. A pressurized water nuclear rector core comprising a fuel assembly having a multiplicity of fuel rods including a first fuel rod type provided with mixed oxide fuel and a second fuel rod type provided with mixed oxide fuel in conjunction with a neutron poison, the mixed oxide and neutron poison being intimately mixed in the second fuel rod type, the fuel rods having peripheral fuel rods wherein between 50 and 100% of the peripheral fuel rods of the assembly being of the second fuel rod type.

12. A pressurized water nuclear reactor core according to claim 11, the reactor core having a peak rod power to an average assembly power ratio between 1:65:1 and 1:4:1.

* * * * *

UNITED STATES PATENT AND TRADEMARK OFFICE
CERTIFICATE OF CORRECTION

PATENT NO.   : 6,301,320 B1
DATED         : October 9, 2001
INVENTOR(S)  : Gwilym Michael Thomas and Kevin Wynn Hesketh It is certified that error appears in the above-identified patent and that said Letters Patent is hereby corrected as shown below:

Column 3,
Line 35, before "fuel rods" change "second,type" to -- second type --
Line 53, before "rods" change "typesfuel" to -- type fuel --

Column 4,
Line 1, before "and more" change "10%," to -- 100%, --

Column 5,
Line 31, before "depleted" insert -- by --

Column 9,
Line 4, after "fuel rods" change "having" to -- including an outer --
Line 4, after "peripheral" insert -- row of --
Line 5, after "100% of" change "the,peripheral" to -- the outer peripheral --
Line 5, before "fuel" insert -- row of --
Line 6, after "assembly" change "being" to -- are --
Line 8, before "peripheral" insert -- outer --
Line 8, before "fuel" insert -- row of --
Line 11, before "peripheral" insert -- outer --
Line 11, before "fuel" insert -- row of --

Column 10,
Line 10, before "nuclear" delete "pressurized water"
Line 10, after "nuclear" change "rector" to -- reactor --
Line 16, after "rods" change "having" to -- including an outer --
Line 16, after "peripheral" insert -- row of --

UNITED STATES PATENT AND TRADEMARK OFFICE
CERTIFICATE OF CORRECTION

PATENT NO.   : 6,301,320 B1
DATED        : October 9, 2001
INVENTOR(S)  : Gwilym Michael Thomas and Kevin Wynn Hesketh It is certified that error appears in the above-identified patent and that said Letters Patent is hereby corrected as shown below:

<u>Column 10 cont'd.</u>
Line 17, before "peripheral" insert -- outer --
Line 17, before "fuel" insert -- row of --
Line 18, after "assembly" change "being" to -- are --

Signed and Sealed this

First Day of October, 2002

Attest:

Attesting Officer

JAMES E. ROGAN
Director of the United States Patent and Trademark Office